(12) United States Patent
Khademhosseini

(10) Patent No.: US 9,962,026 B2
(45) Date of Patent: May 8, 2018

(54) INTEGRATED KNIFE RACK WITH TRAY AND SPICE CONTAINER

(71) Applicant: Nami Khademhosseini, Falls Church, VA (US)

(72) Inventor: Nami Khademhosseini, Falls Church, VA (US)

(73) Assignee: ND PRODUCTS, INC., Falls Church, VA (US)

( * ) Notice: Subject to any disclaimer, the term of this patent is extended or adjusted under 35 U.S.C. 154(b) by 13 days.

(21) Appl. No.: 15/462,807

(22) Filed: Mar. 18, 2017

(65) Prior Publication Data

US 2017/0367512 A1    Dec. 28, 2017

Related U.S. Application Data

(60) Provisional application No. 62/493,158, filed on Jun. 24, 2016.

(51) Int. Cl.
| | |
|---|---|
| A47G 21/14 | (2006.01) |
| A47J 47/00 | (2006.01) |
| A47J 47/16 | (2006.01) |
| A47J 43/28 | (2006.01) |

(52) U.S. Cl.
CPC .............. *A47G 21/14* (2013.01); *A47J 43/28* (2013.01); *A47J 47/005* (2013.01); *A47J 47/16* (2013.01)

(58) Field of Classification Search
CPC ......... A47G 21/14; A47J 47/16; A47J 47/005; A47J 43/28

USPC .............. 211/70.7; 248/37.3, 37.6; 30/298.4; D7/637

See application file for complete search history.

(56) References Cited

U.S. PATENT DOCUMENTS

| | | | | |
|---|---|---|---|---|
| 4,412,618 A | * | 11/1983 | La Conte | B25H 3/06 132/286 |
| 4,693,439 A | * | 9/1987 | Hahn | A47G 21/14 248/300 |
| D338,376 S | * | 8/1993 | Ulber | D7/637 |
| 5,775,518 A | * | 7/1998 | Connor | A47G 21/14 211/163 |
| 5,850,784 A | * | 12/1998 | Conner | A47G 21/14 211/70 |
| 7,275,647 B1 | * | 10/2007 | Thompson | A47B 81/007 211/85.18 |
| 2004/0148787 A1 | * | 8/2004 | Rosenberg | A47G 21/14 30/298.4 |
| 2012/0266468 A1 | * | 10/2012 | Murphy | B24D 15/084 30/298.4 |
| 2013/0037501 A1 | * | 2/2013 | Schmidt | A47G 21/14 211/70.7 |
| 2015/0257563 A1 | * | 9/2015 | Ludeman | A47J 47/16 211/70.7 |

* cited by examiner

*Primary Examiner* — Patrick D Hawn
(74) *Attorney, Agent, or Firm* — Maxvalueip LLC

(57) ABSTRACT

In one example, we describe a device for an efficient and compact rack system for knives and other kitchenware. This stylish design integrates: One or more (e.g., three) grinders, a cutting/chopping board, a tray, and a complete full size knife rack, as an example. All these kitchen tools are specifically designed to fit in the same space that a full-size knife rack normally takes. Many different variations are shown here, as well.

13 Claims, 7 Drawing Sheets containers

INTEGRATED KNIFE RACK WITH TRAY AND SPICE CONTAINER

RELATED APPLICATIONS

This application is based on a provisional application 62/493,158, filed on Jun. 24, 2016, with the same inventor. We claim priority on that application's filing date. We incorporate by reference all the teachings of that application in this application.

BACKGROUND OF THE INVENTION

Usually, in the kitchen and table, there is not enough space for everything needed. So, there is a need for Integrated Knife Rack with Tray and Spice Containers or Grinders, plus Chopping Board. It is a space saver and efficient kitchen countertop rack in which it integrates big pieces of kitchen tools that need to be kept handy, while keeping them organized and saving countertop space at the same time. No other prior art has solved this problem this way and this efficiently.

SUMMARY OF THE INVENTION

In one embodiment, we describe a method and a device for such a rack system. This stylish design integrates: One or more (e.g., Three) grinders or spice containers, a cutting/chopping board, a tray, and a complete full size knife rack. All these kitchen tools are specifically designed to fit in the same space that a full-size knife rack normally takes. Many different variations are shown here, as well.

DETAILED DESCRIPTION OF THE PREFERRED EMBODIMENTS

Figure 1:
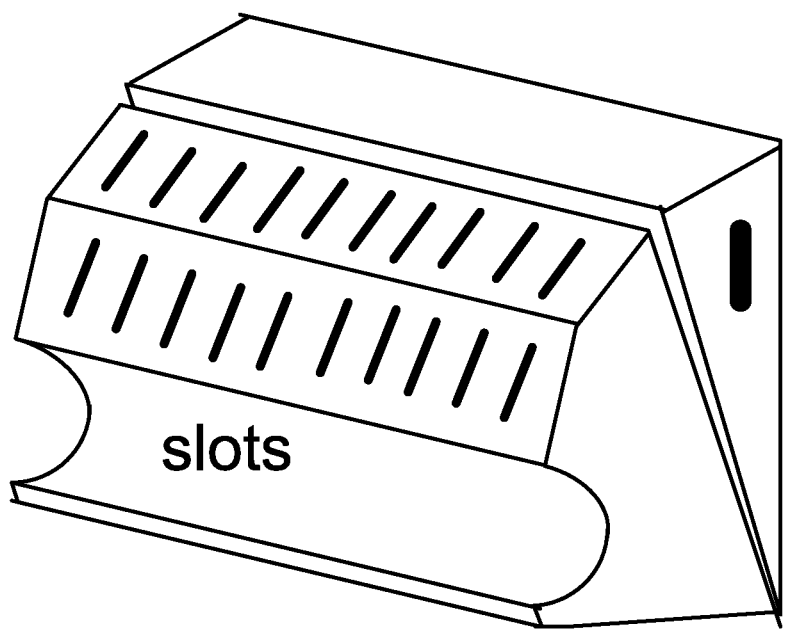
FIG. 1 is for one embodiment, as an example, for the rack.

The invention enables efficient usage of the space in the kitchen. These are some variations, embodiments, or examples: The knife rack of FIG. 1 shows the look of the knife rack with the multifunctional board stored in its designated space in the back, between the rack and the wall, in a 90-degree angle to the countertop, which works as a cutting board and tray.

The cylindrical grinder (FIG. 2) is to keep salt and pepper and other spices handy. These grinders are vertically positioned in the concaved groove in front-bottom of the knife rack (FIG. 1). They also use caps to prevent from accidental dispensing.

Figure 4:
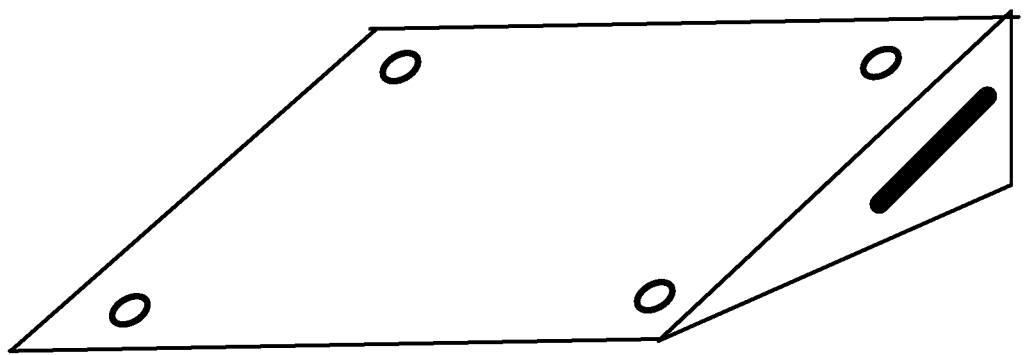
FIG. 4 is for one embodiment, as an example, for the cutting board.
Figure 5:
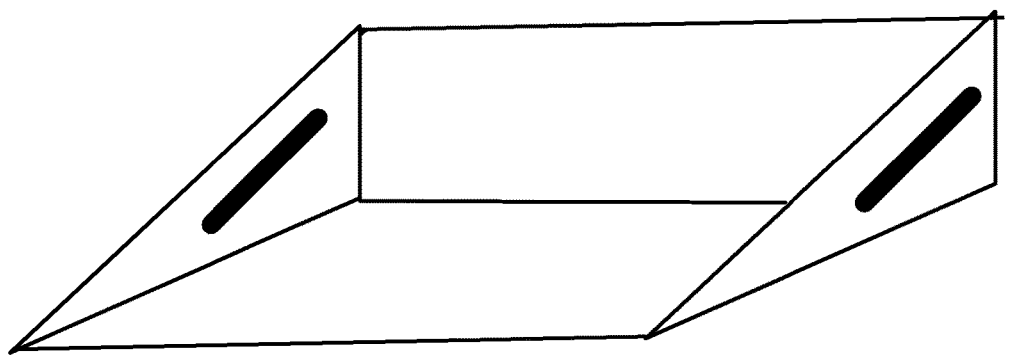
FIG. 5 is for one embodiment, as an example, for a tray.

The drawing in FIG. 4 shows the cutting board when is pulled out of the knife rack for use. This piece can easily slide in or out, sideway. FIG. 4 shows the board while is pulled out and placed on a surface to be used as a cutting or chopping board. The same board can be turned over and be used as a tray (FIG. 5). In this position, the four convex buttons on four corners keep the bottom off the table or countertop surface, and in upright position, and when stowed away, it will keep the chopping board surface from touching the wall.

The top knife slots are designed so that they do not cross in 90 degree angle (e.g., less than 90 degrees), to the second row at the bottom, to allow knife blade from top row position in between others at the bottom row. Therefore, the knife handle makes a smaller angle to the horizontal surface of the countertop, and allows the user to put the larger or longer knives out or put back in easily, without bumping her wrist to the top cabinet, which is very inconvenient, especially in the small standard space between the countertops and top cabinets, which is about 18-24 inches, e.g., 20 inches.

This invention also eliminates the storage need for 6 common and frequently used kitchen tools that need to be kept handy on the countertop, and also helps keeping the kitchen organized within one stylish and space-efficient unit, that takes the same space as a full-size conventional knife-rack.

In one embodiment, we have:

1. Each row of knife holder slots on this rack is designed with two different angles for two sets of positioning in the rack, which facilitates placing or removing the knives in and out of the rack, for example, within the small space between the kitchen countertop and the top wall mounted cabinets (about 18-24"), by creating a closer or smaller angle to the horizontal plane/support surface (countertop), where the rack is placed on.

Figure 2:
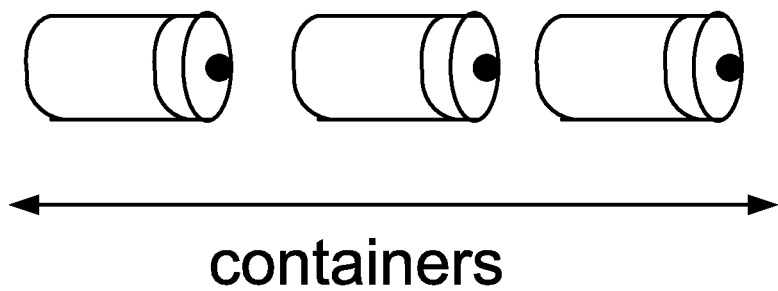
FIG. 2 is for one embodiment, as an example, for cylindrical grinder to keep salt and pepper and other spices. (The grinders may be in cylindrical, rectangular, circular, triangular, or other forms or shapes, in cross section or length.)
Figure 3:
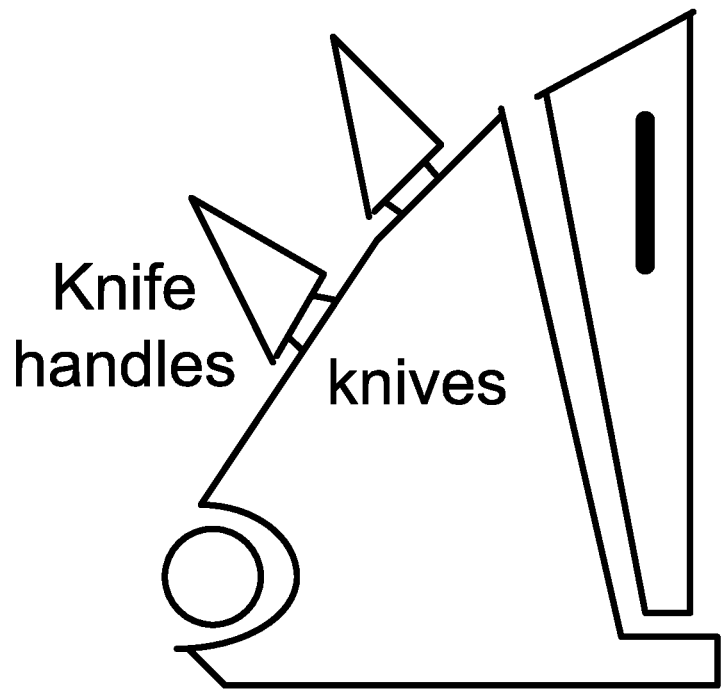
FIG. 3 is for one embodiment, as an example, for the rack at side view. Mainly, it shows the cross positioning of the knife blades between the top and lower rows.

The top row of knife slots can have up to 75 (e.g., about 70) degree angle, as one example, and the lower row can be more than e.g. 30 degree angle, to the countertop surface, which is placed in between the top rows (FIG. 2). In one embodiment, we have the lower row of slots positioned in different vertical zone, comparing to the upper row, and placed in between the upper row of knife slots (FIG. 3).

The said positioning allows the blade of the knives in the lower row of slots to fit in between the knives' blades' tips that are put in the upper row, so that the knives in upper slots and lower slots do not intersect, therefore, all the knives in both rows fit in the rack properly.

2. The tray and chopping board are actually one-piece with different use on each sides, and can be used for either purpose (tray or chopping board), as the user reverses the part or turns it upside down. The said part can slide behind the rack in the space between the rack and the wall behind the rack, over the narrow slot along the width of the rack at the bottom, and behind the rack.

The said slot that holds the narrow side of the tray/chopping board part not only helps with space efficient storing, but also helps with draining the tray and chopping board, while this multipurpose part is in the stored position in the back of the rack (FIG. 1).

3. The rectangular tray and chopping board combination can be used in two different positions: When used with surface up (FIG. 4), it can be used as chopping board with a slight slope towards the user, and higher side away from the user.

When the said part is reversed with the hollow side up, it can be used as a tray (FIG. 5). The said part comprises of four small convex buttons, or like ridge, on each corner, that works as small supports or legs which separate the bottom surface of the part from any surface the tray is put on, in order to keep the bottom chopping board surface touch-free and clean.

The said part is used as a tray when the surface is down. It provides space inside to put anything needed in the tray, and has a hollow space on each of the right and left rectangular sides, which can be used as handles to carry the tray.

4. This design shows a new horizontal positioning of spice cellars or grinders (FIG. 2), in the horizontal space designed in the front of the rack.

The integrated rack (FIG. 1) shows the look of the knife rack with the multifunctional board stored in the back, between the rack and the wall behind it, in 90 degree angle, which works as cutting board on one side and tray on the reverse side.

Cylindrical spice shakers (grinder/shaker) (FIG. 2) is vertically positioned in the groove in front-bottom of the knife rack (FIG. 1). The drawing in FIG. 4 shows the cutting board when is pulled out of the rack for use. It has slope that is placed towards the user, while in use as cutting or chopping board.

The said part can be turned over and be used as a tray (FIG. 5). The said surface has four small convex supports on each corner, which prevent the cutting board surface under the tray from touching other surfaces, such as countertop and tables in order to keep it contact-free and clean.

The slots for holding knife are designed to allow knife blade from top row positioned in between others in bottom row, as perpendicular, therefore, the knife handle making a smaller angle to the horizontal surface of table or countertop, and allowing the user to put the long knives easily in the small space between the countertop and top cabinets, which is about 24 inches, for example.

Figure 6:
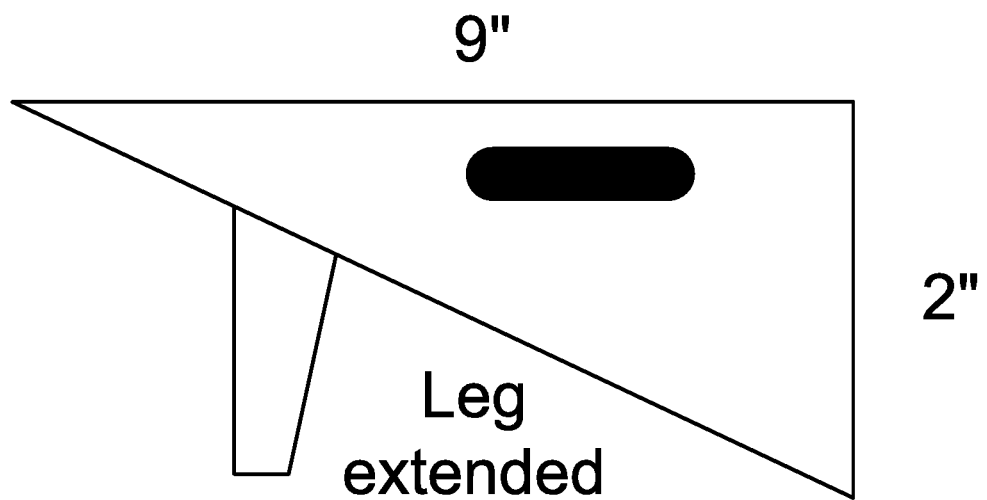
FIG. 6 is for one embodiment, as an example, for side view of the system or assembly.

FIGS. 5 and 6 show the tray/board that can incorporate two small folding legs inside the tray wall. These legs will level the board, when in open position. In one example, these small legs are part of the tray wall, when in closed position. This design eliminates the storage need for at least 5 necessary kitchen tools including knife rack, two grinders, tray, and chopping board that need to be kept handy at all times. By doing so, all the space for storing these kitchen tools integrates into a one efficient and space saving rack.

The other embodiments are described below, referring to pages of Figures in Appendix 1, FIGS. 1-18:

1) The first photo shows that the triangular tray wall. Finger tip slot has an angle to the top of the triangular wall, which creates a special ergonomic angle between the palm, wrist, and the arm of the user, creating a comfortable position.

2) It shows that the foldable legs can transfer the tray (in reverse position) to a chopping board that has a clearance space under, to place a container, in which the chopped food is dropped from the chopping board surface.

3) It shows the capacity of the knife rack, and how many pieces of kitchenware it is capable of storing, very efficiently, with least space taken from the kitchen countertop.

4) It shows how the tray part is put or removed from the rack.

5) & 6) It shows the close up of the mechanism of the folding leg inside the tray wall.

Note that the first 6 photos in Appendix 1, FIGS. 1-6, mentioned above, are examples for the main invention, and the rest, Appendix 1, FIGS. 7-18, are additional photos in different angles, for variations and better descriptions.

Appendix 2, FIGS. 1-2, are also additional photos in different angles, for variations and better descriptions.

In one embodiment, we have: A knife rack system, said system comprising: a housing; one or more slots for holding one or more knives within said housing; a board; and a spice container section. Other variations are:

a tray.
chopping board without folding legs.
chopping board with suction units for stability.
wherein said board is converted to a tray.
a knife sharpening tool.
one or more legs or stands or arms.
one or more legs or stands or arms which is foldable.
said one or more slots are at least 2 slots, and said one or more slots have different sizes or dimensions for slots.
said one or more slots are at least 2 slots, and said one or more slots have different angles or directions for slots.
said one or more slots are at least 2 slots, and said one or more slots have same sizes or dimensions for slots.
said one or more slots are at least 2 slots, and said one or more slots have same angles or directions for slots.
an inclined surface.
a handle or grip location.
one or more hinges.
a slide flat tray.
a spice container.
one or more spice containers or grinders.
salt/pepper shakers or containers.
one or more gaps for air circulation.
a bottom tray for water drainage under said housing, with one or more gaps in said housing.
said housing is waterproof or water-resistant.
said housing is made of metal, alloy, wood, or plastic.
one or more elastic suction units under said housing, for stability or grip of said housing on a countertop or table, so that the housing does not move or get toppled down, holding tight to the surface underneath.

For the regular Figs., we have: FIG. 1 is for one embodiment, as an example, for the rack. FIG. 2 is for one embodiment, as an example, for cylindrical grinder to keep salt and pepper and other spices. FIG. 3 is for one embodiment, as an example, for the rack at side view. FIG. 4 is for one embodiment, as an example, for the cutting board.

Figure 7:
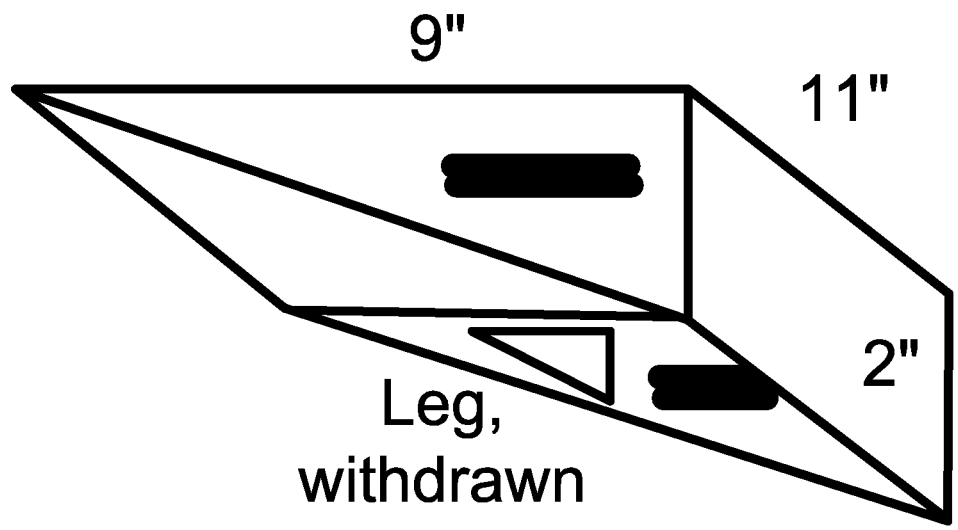
FIG. 7 is for one embodiment, as an example, for the tray/board that need two small folding legs inside the tray wall. These legs will level the board, when in open position.

FIG. 5 is for one embodiment, as an example, for a tray. FIG. 6 is for one embodiment, as an example, for side view of the system or assembly. FIG. 7 is for one embodiment, as an example, for the tray/board that need two small folding legs inside the tray wall. These legs will level the board, when in open position. Please note that the sizes and parameters in Figs. are all examples, and not limiting for the general teaching at all.

Please note that the handle of the tray in figures above can be wide, or narrow, in both directions, and it can be parallel to any of the lines or sides, or not parallel, or in between those lines, e.g., as a bisector line or median line, with respect to each side or face of the object or plane of the object. So, the direction of the handle gap or slit or slot or opening or hole or cross section can go from parallel to perpendicular, and to any angle in between, with respect to each side or face of the object or plane of the object or tray. The shape of the handle gap or slit or slot or opening or hole or cross section can be oval, circle, rectangle, square, triangle, pentagon, polygon, curved-ended, sharp-corners, ellipse, wide line, narrow line or band, or the like.

In one embodiment, we have Integrated Knife Rack with Tray(s), Chopping Board(s), and Spice Containers or Grinders, or other kitchenware or apparatuses or devices or tools, e.g., screw driver or flash light, for other variations.

The material and size of the system or apparatus described here can be widely diverse and different, e.g., made of wood, plastic, elastic, rubber, artificial materials, wool, fabric, glass, crystal, metal, alloy, carbon, mortar, concrete, brick, clay, transparent materials, translucent materials, acrylic, stone, artificial stone, compacted stone or powder, glued materials, layered or stacked materials, or the like, and e.g., for sizes around from 0.5" or 0.5 ft as lower end of the range, to 3-6 ft, as upper range or values, in length and width and height, or other dimensions, in the images shown. However, these numbers and materials are just examples, and not limiting the invention by any means, in spec or figures or for any purpose.

Any variations and combinations of the above teachings are also intended to be covered by this patent application.

The invention claimed is:

1. A knife rack system, said system comprising:
a housing; a bottom tray for water drainage under said housing;
one or more slots for holding one or more knives within said housing;
a board;
wherein said board is separable from said housing;
wherein said board is capable of converting to a tray;
wherein said board comprises two foldable legs, one on each of opposite triangular sides of said board;
wherein each of said two foldable legs is attached to an inside of the respective triangular side of said board;
wherein each of said two triangular sides of said board are perpendicular to said board;
wherein top surface of said board is capable of being horizontal, parallel to a ground surface, when said two foldable legs are fully opened and placed on the ground surface;
a spice container holding compartment.

2. The knife rack system as recited in claim 1, said system comprising:
a knife sharpening tool or a pair of scissors.

3. The knife rack system as recited in claim 1, wherein said one or more slots are at least 2 slots, and said one or more slots have different sizes or dimensions for slots.

4. The knife rack system as recited in claim 1, wherein said one or more slots are at least 2 slots, and said one or more slots have different angles or directions for slots.

5. The knife rack system as recited in claim 1, wherein said one or more slots are at least 2 slots, and said one or more slots have same sizes or dimensions for slots.

6. The knife rack system as recited in claim 1, wherein said one or more slots are at least 2 slots, and said one or more slots have same angles or directions for slots.

7. The knife rack system as recited in claim 1, said system comprising:
an inclined, round, or convex surface.

8. The knife rack system as recited in claim 1, said system comprising:
a handle or grip location.

9. The knife rack system as recited in claim 1, said system comprising:
one or more hinges.

10. The knife rack system as recited in claim 1, wherein said one or more slots are at least 3 slots and are located in one or more rows.

11. The knife rack system as recited in claim 1, said system comprising:
one or more spice containers.

12. The knife rack system as recited in claim 1, wherein said housing is made of metal, alloy, wood, or plastic.

13. The knife rack system as recited in claim 1, said system comprising:
one or more elastic suction units under said housing, for stability or grip of said housing on a countertop or table.

* * * * *